Aug. 16, 1966  F. SINGER  3,266,400
PHOTOGRAPHIC SHUTTER
Filed June 1, 1964  2 Sheets-Sheet 1

United States Patent Office 3,266,400
Patented August 16, 1966

3,266,400
PHOTOGRAPHIC SHUTTER
Franz Singer, Munich, Germany, assignor to Compur-Werk, G.m.b.H., & Co., Munich, Germany, a company of Germany
Filed June 1, 1964, Ser. No. 371,252
Claims priority, application Germany, June 11, 1963, C 30,170
4 Claims. (Cl. 95—63)

The present invention relates to a photographic shutter including a main driving member which actuates the shutter blades, the position of the main driving member being controlled by a cocking means with locking means for holding the main driving member in a cocked position, both the cocking means and locking means being controlled by a single actuating member.

It is desirable to provide a camera shutter which may be readily converted from a cocking shutter to an automatic shutter. This objective is achieved by the present invention by providing an actuating means which is disposed outside the shutter housing and which, when rotated, first moves the cocking means into a cocking position and then actuates the locking means to release the main driving member and operate the shutter. The actuating means may comprise a ring having an operating arm thereon with a portion of said ring formed with a driving edge to engage the cocking means. A separate cam surface on the ring is engageable with the locking lever to release the main driving member for its run-down movement. There is provided a yieldable means on the cocking means which provides for an operative engagement between the actuating ring and the cocking spindle during movement of the ring in one direction but permits the engaging portion of the actutating ring to pass by the cocking means without rotation thereof when the actuating ring is rotated in an opposite direction.

An object of the present invention is to provide an actuating member for a photographic shutter, the member being in the form of a ring and having an edge portion engageable with the cocking means and a cam surface engageable with the locking means.

Other objects and many of the attendant advantages of the present invention will become more readily apparent upon consideration of the following detailed specification in connection with the accompanying drawings wherein.

Figure 3:
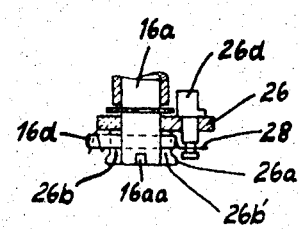
FIG. 3 is a cross-section on the line III—III of FIG. 2 showing a particular part of the shutter.
Figure 1:
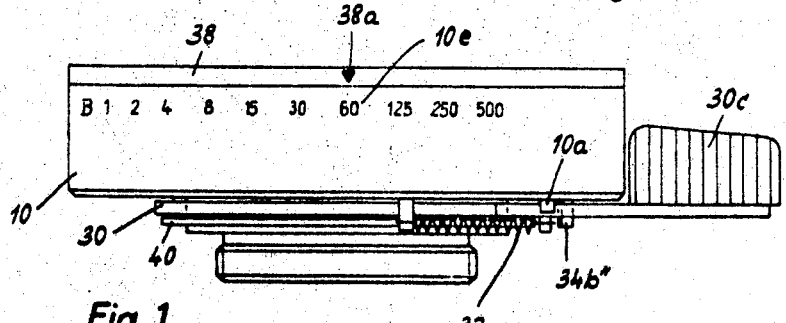
FIG. 1 is a plan view of a shutter.
Figure 4:
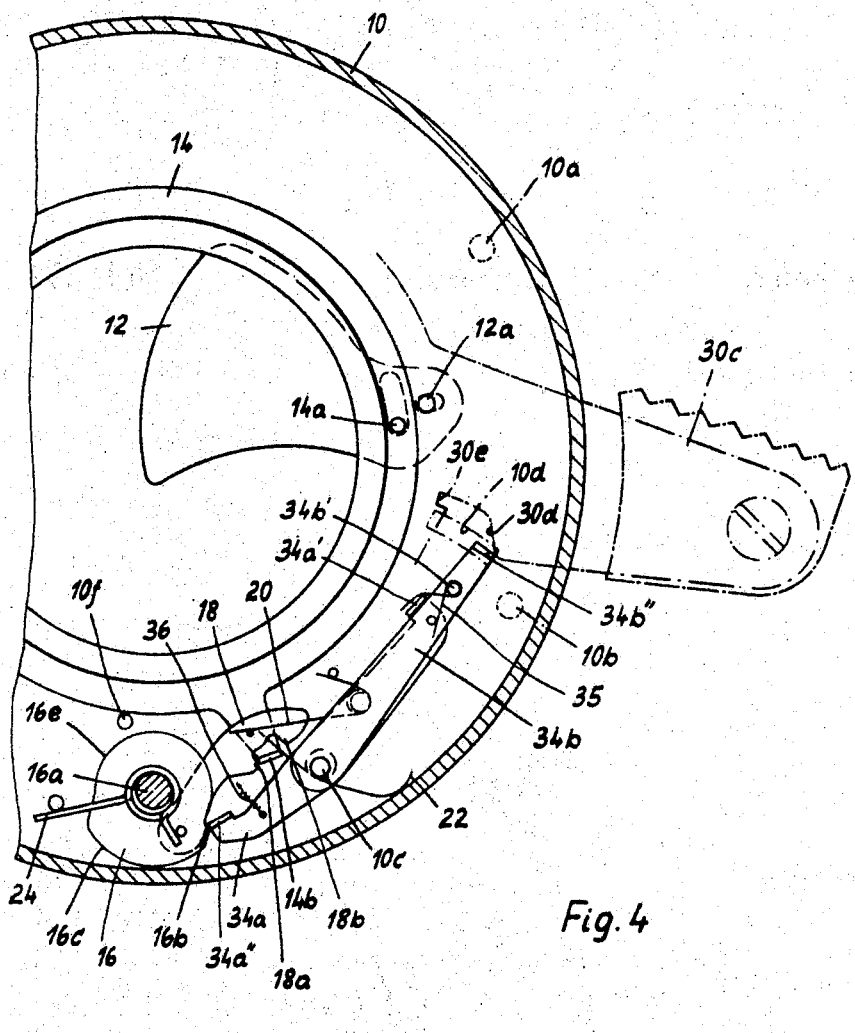
FIG. 4 shows, on an enlarged scale, the main drive of the shutter in an operative position different from FIG. 2.

The illustrated shutter is a cocking shutter of the known kind, the mechanisms of which are mounted in a shutter housing 10. It comprises, for example, five shutter blades 12 of which only one is shown in FIG. 4 for the sake of simplicity. Each blade 12 is mounted at 12a in the shutter housing 10 and is actuated by a driving pin 14a on a blade operating ring 14 in a to and fro movement for the purpose of opening and closing the lens aperture. The blade operating ring is driven by a main driving member 16 and a crank 18 pivotally connected to the latter and cooperating with the upwardly-bent end of an arm 14b of the blade operating ring 14. To this end the crank 18 has a crank arm 18a and a further crank arm 18b, the crank being urged in the clockwise direction by a spring 20 and held against the arm 14b of the blade operating ring 14. A further spring 22 which engages the arm 14b of the blade operating ring 14, urges the latter into its rest position and maintains the blades closed. The main driving member 16 has a cocking spindle 16a which projects rearwardly from the shutter housing and the member 16 also has a nose 16b, a control cam 16c, and a driving spring 24 which strives to move the main driving member in the counter-clockwise direction. Freely rotatable on the rear end of this cocking spindle 16a is a cocking sleeve 26 (FIG. 3). The cocking sleeve 26 is provided with a cylindrical collar 26a and this collar has two opposed slots 26b and 26b' which form two driving claws 26c and 26c'. In addition, a stepped pin 26d is secured in the cocking sleeve 26. A transverse driving pin 16d which is secured in the cocking spindle 16a is so dimensioned that its ends lie in the slots 26b and 26b'. A volute spring 28 one end of which engages the driving pin 16d and the other end of which engages the pin 26d, strives to turn the cocking sleeve 26 in the clockwise direction, so that the driving claws 26c, 26c' are in engagement with the pin 16d.

An actuating ring 30 is rotatably mounted on the rear lens tube outside the shutter housing 10 and is held against axial movement by a spring ring 40. The ring 30 has an opening 30a through which extends the cocking spindle 16a, and in addition a driving tooth 30b which cooperates with the pin 26d. Furthermore, the actuating ring 30 has a radial operating handle 30c, a control cam 30d and a notch 30e. A return spring 32 urges the actuating ring 30 in the counter-clockwise direction and presses it against a fixed abutment pin 10a. To limit rotation of the actuating ring 30 there is provided a further abutment pin 10b.

Rotatably mounted on a fixed stud 10c in the shutter housing 10 is a locking lever comprising two parts 34a and 34b. These lever parts 34a and 34b are connected together by a hairpin spring 35, the lever part 34b being pressed against a shoulder 34a' on the part 34a. A further spring 36 attached to the lever part 34a strives to turn both lever parts 34a and 34b in the clockwise direction, a lug 34a" of the lever part 34a cooperating with the main driving member 16. The other lever part 34b carries a pin 34b' and a bent lug 34b" which extends rearwardly through a slot 10d in the rear wall of the shutter housing 10 and cooperates with the actuating ring 30.

Adjustment to the required exposure time is effected by means of an exposure time-setting ring 38 which is coupled to a time control ring (not shown). The exposure time-setting ring 38 has a mark 38a which is adjustable over a fixed time scale 10e mounted on the periphery of the shutter housing.

The method of operation of the described shutter is as follows:

The shutter is set to an exposure time of $\frac{1}{60}$ sec. as shown in the drawings. If the operator now wants to take a photograph, he must move the actuating ring 30 in the clockwise direction against the action of the return spring 32. The shutter is cocked at the beginning of this adjusting movement of the actuating ring 30, the driving tooth 30b engaging the pin 26d and, through this, moving the cocking sleeve 26 in the same direction. The driving claws 26c, 26c' of the cocking sleeve 26 move the pin 16d with them, so that the cocking spindle 16a is likewise turned in the clockwise direction. Thus, the main driving member 16 mounted inside the shutter is turned in the same direction, whereby the lug 34a" of the lever part 34a which is in engagement with the peripheral surface 16e of the main driving member 16, is moved in the counter-clockwise direction by the control cam 16c of the main driving member at the beginning of this cocking movement. Not until the end of the cocking movement does the lug 34a" slide off the control cam 16c, whereupon both lever parts 34a, 34b are pivoted in the clockwise direction under the action of the spring 36 so that the lug 34a" is positioned in front of the nose 16b and thereby holds the main driving member 16 together with cocking sleeve 26 in the cocked position. In this adjusting movement of the main driving member 16 into the cocked position the crank 18 which is pivotally connected to the member, is also moved with the latter. Since the crank arm 18a is out of engagement with and in front of the arm 14b in the rest position, a rightwards movement of the crank 18 during the first phase of the cocking movement does not influence the arm 14b of the blade operating ring 14. In fact, the crank arm 18a slides, under the action of the spring 20, over the inner surface of the arm 14b facing the center of the shutter. During the second phase of the cocking movement the crank 18 moves to the left again until it assumes the position shown in FIG. 4.

Figure 2:
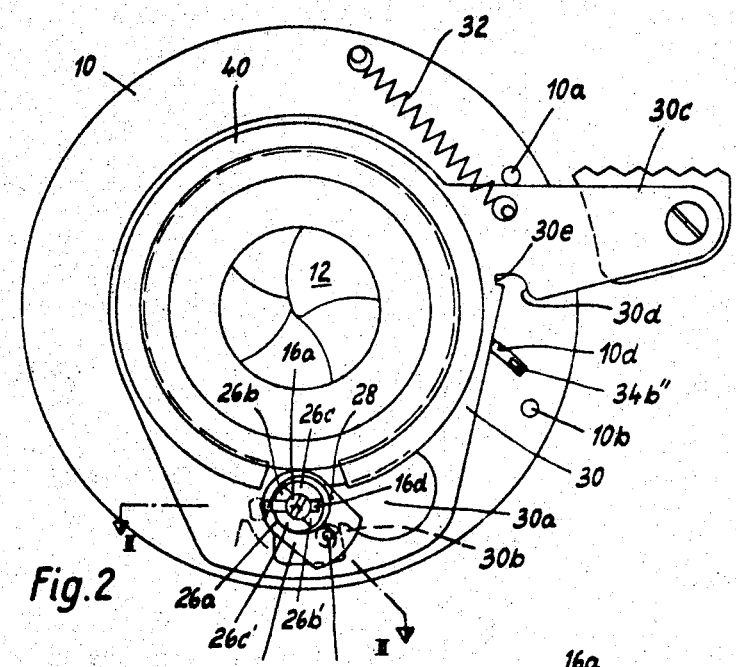
FIG. 2 is a rear view of the shutter.

In the described adjusting movement of the actuating ring 30 in the clockwise direction, the members 26, 16 are accordingly positively moved into the cocked position. When these members have reached and have been locked in this cocked position, the driving engagement between the driving tooth 30b of the actuating ring 30 and the pin 26d of the cocking sleeve 26 is broken (the position indicated in dotted lines in FIG. 2), so that only the actuating ring 30 is now moved further. After a short free movement (over-run) of the ring 30, the control cam 30d of the actuating ring 30 comes into contact with the lug 34b" so that, on further rotation of the actuating ring (up to the abutment 10b), the positively coupled lever parts 34a and 34b are turned in the counter-clockwise direction by the control cam 30d. The main driving member 16 is thus freed and moves under the action of its spring 24 in the counter-clockwise direction out of the cocked position shown in FIG. 4 towards the rest position which is determined by a fixed abutment pin 10f against which the nose 16b of the main driving member abuts. In the initial phase of this run-down movement the control cam 16c of the freed main driving member 16 urges the lug 34a" of the lever part 34a outwardly and hence against the periphery of the shutter, so that the lever parts 34a, 34b are moved in the counter-clockwise direction until the lug 34b" of the lever part 34b comes into locking engagement with the notch 30e in the actuating ring 30, the effect of this being that the actuating ring 30 is firmly held in this operative position after release of the shutter.

During the course of the run-down movement of the main driving member 16 the crank 18 is first moved to the right, its crank arm 18a moving the arm 14b of the blade operating ring in the counter-clockwise direction to open the shutter blades 12. In the second phase of this run-down movement of the main driving member the crank 18 is again moved to the left, whereby its other crank arm 18b now moves the arm 14b and the blade operating ring 14 in the clockwise direction and back to the rest position shown in FIG. 4 to close the blades. Shortly before the termination of the run-down movement of the main driving member 16 the lug 34a" slides, under the action of the spring 36, off the control cam 16c of the main driving member on to the peripheral surface 16e of the main driving member, the lever parts 34a and 34b being turned in the clockwise direction under the action of the spring 36 so that the locking engagement between the lug 34b" of the lever part 34b and the notch 30e in the actuating ring 30 is thereby broken. The actuating ring 30 can thereupon run-down in the counter-clockwise direction to the rest position shown in FIG. 2 under the action of its return spring 32. In this case, after a specific return movement, the driving tooth 30b comes into engagement with the driving pin 26d of the cocking sleeve 26 which is already in the rest position so that the cocking sleeve 26 is moved through the driving pin 26d in the counter-clockwise direction and against the action of the coupling spring 28. This yielding movement of the cocking sleeve 26 relatively to the components 16a and 16d in the rest position is necessary to allow complete return of the actuating ring 30 to the rest position. The slots 26b and 26b' which are for the purpose of this yielding movement are of such a width that they permit an idle or yielding movement of the cocking sleeve 26 with respect to the driving pin 16d. At the end of the return movement of the actuating ring 30 the pin 26d slides off the driving tooth 30b under the action of the spring 28, the cocking sleeve 26 moving in the clockwise direction into the rest position illustrated in FIG. 2. The correct position of engagement of the members 26d and 30b is thus restored.

Now, if the operator wants to take a "B"-photograph the mark 38a on the exposure time-setting ring 38 must be moved to "B." The time control ring coupled to the exposure time-setting ring is also moved with the latter, a control edge thereof (not shown) being positioned relatively to the pin 34b' of the lever part 34b. A "B"-locking lever (also not shown) inside the shutter simultaneously comes into operation and cooperates in the known way with the main driving member and hence the blade operating ring. Now, if the actuating ring 30 is again moved in the clockwise direction during "B"-setting, the same movements as in the first described setting of the exposure time-setting ring 38 to 1/60 sec. are performed. The difference is that, after subsequent cocking of the shutter, on further movement of the actuating ring 30 the lug 34b" of the lever part 34b can be moved by the control cam 30d in the clockwise direction only while the pin 34b' of the lever part 34b abuts against the aforesaid control edge of the time control ring which is operative only for "B" setting, and—as soon as the main driving member 16 is freed at 34a"—prevents the lug 34b" entering the notch 30e. The actuating ring 30 is thus prevented from being locked after release of the shutter in a "B"-setting.

In this pivoting movement in the counter-clockwise direction of the lever parts 34a, 34b which is limited by the control edge of the time control ring, during "B"-setting, the main driving member 16 is freed for a run-down to its rest position and the control cam 16c again comes into engagement with the lug 34a", in this case only the lever part 34a being moved further in the counter-clockwise direction since the other lever part 34b is prevented from turning with the part 34a by abutment of its pin 34b' against the aforesaid control edge of the time control ring. In this event, the shoulder 34a' of the lever part 34a disengages from the lever part 34b against the action of the coupling spring 35. In the further course of the run-down movement of the main driving member 16 the shutter blades 12 are moved by the members 18, 14 to open the lens aperture. The shutter blades remain in this open position as a result of the said "B"-locking lever inside the shutter being held as long as the operator continues to press the handle 30c of the actuating ring 30. On release, the actuating ring 30 immediately returns to its initial position under the action of its return spring 32. At the same time the lens aperture is closed by the shutter blades 12 and the members 16a, 26 again take up their rest position shown in FIG. 2. In addition, the lug 34a" again bears against the peripheral surface 16e of the main driving member so that the original coupled condition of the two lever parts 34a, 34b is restored.

If required, by using means which are known and therefore not shown, an additional locking device controlled by the film transport mechanism can be provided for the actuating ring 30 to avoid double exposures.

It is apparent from the foregoing description that the illustrated embodiment is a normal cocking shutter the main drive of which is cocked, is held in the cocked position by a locking lever, and is released by a release device. This cocking shutter can be converted in a simple manner into an automatic shutter and hence into a shutter in which the shutter driving spring is tensioned and released by actuating a single member 30, by using, in accordance with the invention, several additional parts, viz., mainly the actuating ring 30 and the cocking sleeve 26 with the associating driving pins 26d and 16d, which are situated outside the shutter and consequently can be fitted afterwards. An automatic shutter converted in such a way has the additional advantage that the locking lever determining the cocked position is operative in every condition of use so that the speed of the release movement, i.e., of depression of the actuating ring, can have no unfavorable affect on the exposure time, as is frequently the case in conventional automatic shutters. Moreover, the lock (34b", 30e) which holds the actuating ring for a short time after release, ensures that the actuating ring 30 which is returning after the release cannot damage the cocking spindle, which is also returning, together with the main driving member in the run-down movement.

Should the shutter which is illustrated be used for a purpose other than merely as a cocking shutter, the outer additional parts (30, 26, 16d) can be removed without difficulty, the cocking shutter then being, for example, cocked after its incorporation in the camera by its cocking spindle (16a) being coupled through a coupling slot (16aa) to the film transport mechanism constituting part of the camera, while the release lug (34b") which projects from the shutter housing, can be brought into engagement with a release device already in the camera.

It is apparent that various modifications and alterations are possible in light of the foregoing teachings. What is claimed as new and desired to be secured by Letters Patent is:

1. In a photographic shutter of the class described comprising a shutter housing, shutter blades mounted in said housing for movement between open and closed positions, a main driving member operatively interconnected with said shutter blades for actuation thereof, said main driving member being movable between cocked and run-down positions, a locking member mounted in the housing and engageable with the main driving member to retain the member in a cocked position and release the member for a run-down movement, cocking means operatively associated with said main driving member for moving the main driving member into a cocked position, said cocking means including a cocking spindle for the main driving member and a driving pin mounted on said cocking spindle, and an actuating member movable first to engage the cocking means to cock the main driving member and then to actuate the locking member to release the main driving member for movement to a run-down position, the actuating member having a driving edge for rotation of said driving pin and an operating edge for engagement with said locking member.

2. In a photographic shutter according to claim 1 and further including a cocking sleeve rotatable on the cocking spindle, a slot in said sleeve receiving said driving pin, and a second pin on said sleeve engageable with the driving edge of said actuating member.

3. A photographic shutter comprising a shutter housing, shutter blades pivotally mounted in said housing, a main driving member, means connecting said shutter blades and said main driving member, a cocking spindle rotatable in said housing, said main driving member being secured to said spindle, a driving pin fixed to said spindle and extending transversely thereto, a cocking sleeve slidable on said spindle, an enlarged slot in said sleeve with said driving pin disposed therein, a driving member on said sleeve, locking means engageable with said main driving member to retain said member in a cocked position and to release said member to open and close said shutter blades, an actuating member movable first to engage said driving member to cock the main driving member and then to actuate the locking means to release the main driving member to open and close the shutter blades.

4. A photographic shutter according to claim 3 and including a driving tooth on said actuating member engageable with said driving member to rotate the cocking spindle through a driving connection between the cocking sleeve and driving pin when said actuating member moves in one direction and said driving tooth causing rotation of said cocking sleeve relatively to said driving pin only when said actuating member moves in the opposite direction due to the enlarged slot connecting the cocking sleeve with the driving pin.

References Cited by the Examiner
UNITED STATES PATENTS

| | | | |
|---|---|---|---|
| 1,354,526 | 10/1920 | Underwood | 95—63 |
| 1,663,178 | 3/1928 | Riddell | 95—63 |
| 1,678,119 | 7/1928 | Klein | 95—63 |
| 2,316,020 | 4/1943 | Riddell | 95—63 |

JOHN M. HORAN, *Primary Examiner.*